US012363510B2

(12) United States Patent
Menon

(10) Patent No.: US 12,363,510 B2
(45) Date of Patent: *Jul. 15, 2025

(54) V2X NETWORK COMMUNICATION

(71) Applicant: AT&T Intellectual Property I, L.P., Atlanta, GA (US)

(72) Inventor: Sreejith Menon, Herndon, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,419

(22) Filed: Apr. 24, 2024

(65) Prior Publication Data
US 2024/0276182 A1 Aug. 15, 2024

Related U.S. Application Data

(63) Continuation of application No. 17/490,870, filed on Sep. 30, 2021, now Pat. No. 11,997,567.

(51) Int. Cl.
H04W 4/06 (2009.01)
H04W 4/40 (2018.01)
(52) U.S. Cl.
CPC ............ *H04W 4/06* (2013.01); *H04W 4/40* (2018.02)

(58) Field of Classification Search
CPC .................. H04W 4/06; H04W 4/40
See application file for complete search history.

(56) References Cited

U.S. PATENT DOCUMENTS

| 2010/0251056 A1 | 9/2010 | Dinan |
| 2019/0281587 A1 | 9/2019 | Zhang et al. |
| 2023/0115973 A1 | 4/2023 | Menon |

FOREIGN PATENT DOCUMENTS

| DE | 112018003350 T5 | 3/2020 |
| WO | 2016112496 A1 | 7/2016 |

*Primary Examiner* — Samina F Choudhry
(74) *Attorney, Agent, or Firm* — Guntin & Gust, PLC; Kenneth S. Kwan

(57) ABSTRACT

An evolved multimedia broadcast multicast services (eMBMS) core may map sensor data or telemetry data from a central repository server (e.g., tag it with an area code from where the data is being generated) to a service area. The eMBMS core may inform the radio access network to create a service area for the specific area code, which may be part of or an entire city, county, or the like. Then the radio access network may broadcast the data to the vehicles or devices in the specific area code.

20 Claims, 4 Drawing Sheets

V2X NETWORK COMMUNICATION

CROSS-REFERENCE TO RELATED APPLICATION

The present application claims priority to and is a continuation of U.S. patent application Ser. No. 17/490,870, filed Sep. 30, 2021. All sections of the aforementioned application are incorporated herein by reference in their entirety.

BACKGROUND

V2X, which stands for 'vehicle to everything', is the umbrella term for new vehicle communication systems. There are several components of V2X, including vehicle-to-vehicle (V2V), vehicle-to-infrastructure (V2I), vehicle-to-pedestrian (V2P), or vehicle-to-network (V2N) communications. In this multifaceted ecosystem, vehicles may communicate with other vehicles, which infrastructure (e.g., traffic lights or parking spaces), with pedestrians and their smartphones, and to data centers via wireless networks. Different use cases will have different sets of requirements.

V2X communications reliance on cellular communication may become a mainstream way of communication. As the adoption for autonomous driving and self-driving becomes more standard, cellular operators will determine ways to optimize communication to or from the cellular operator.

This background information is provided to reveal information believed by the applicant to be of possible relevance. No admission is necessarily intended, nor should be construed, that any of the preceding information constitutes prior art.

SUMMARY

Sensor data and telemetric data from may be delivered to various devices (e.g., vehicles) over a wireless network. However, if all the sensor data and telemetric data is being sent as a unicast channel, there is a significant use of bandwidth, which may reduce spectrum efficiency. The disclosed subject matter provides a mechanism to use multicast services for V2X communication that may reduce bandwidth usage and increase spectrum efficiency.

In an example, an evolved multimedia broadcast multicast services (eMBMS) core may map sensor data or telemetry data from a central repository server (e.g., tag it with a code for the area from which the data is being generated) to a service area. The eMBMS core may inform the radio access network to create a service area for the specific area tag, which may be some or all of an entire city, county, or the like. Then the radio access network (RAN) may broadcast the data/signaling to the vehicles or devices in the specific area tag.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Autonomous driving is slowly becoming a reality and may very well be the future of transportation. There are many decision points that should be considered for such autonomous driving or self-driving use cases (e.g., SAE Intl level 3 to level 5 automation). As more and more vehicles make use of autonomous driving, there may be vehicle to vehicle communication and V2X communication which relies even more on the cellular network and infrastructure. This may lead to a capacity crunch for cellular operators or other wireless operators. The disclosed subject matter may allow for more efficient V2X communication by leveraging multimedia broadcast multicast services (MBMS), as disclosed herein, to deliver downlink signaling and data from the network to the vehicles.

Figure 1:
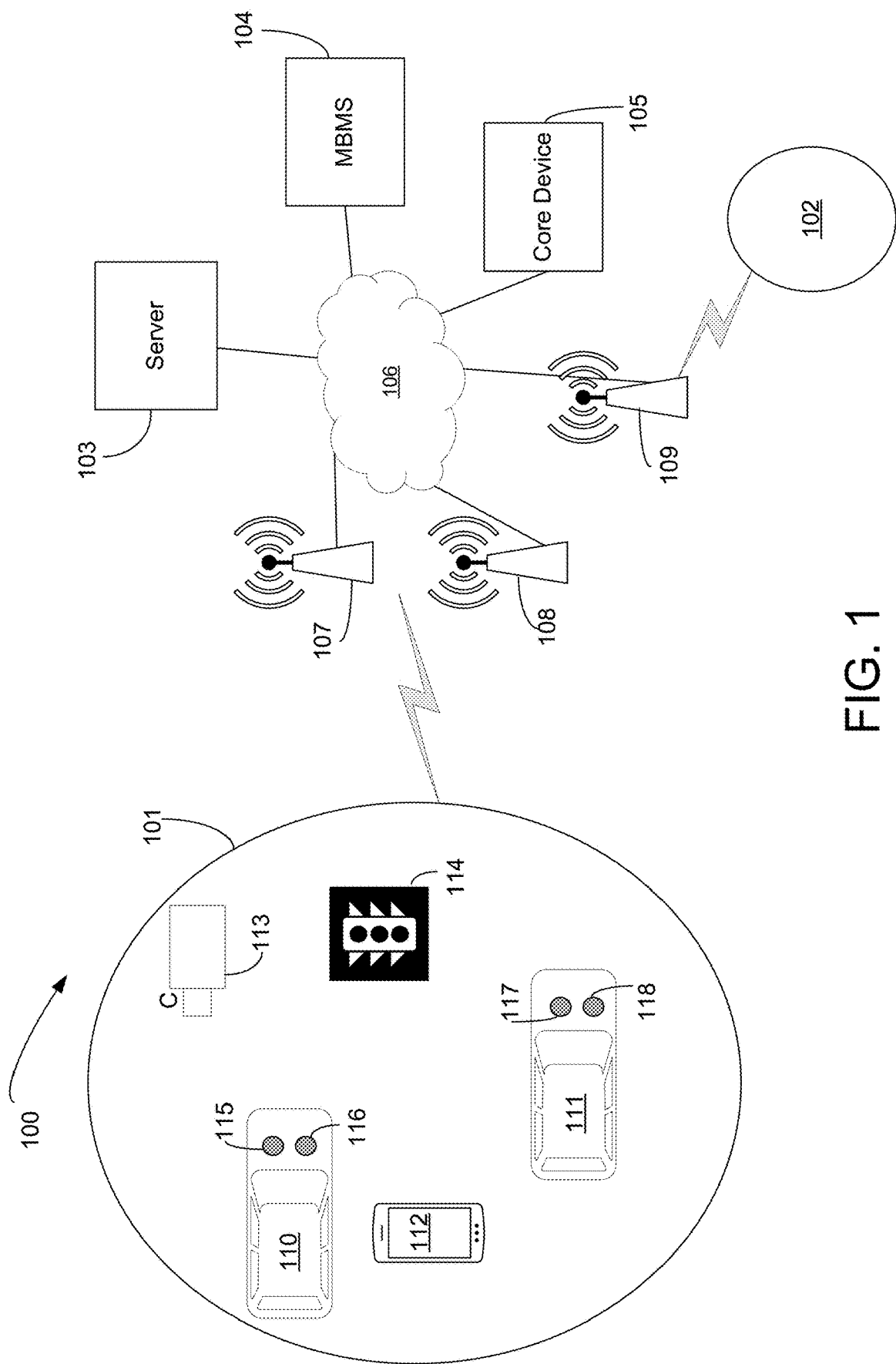
FIG. 1 illustrates an exemplary system for V2X or IoT network communication, among other things.

FIG. 1 illustrates an exemplary system of network communication for V2X, among other things. System 100 may include multiple devices, which may be wired or wireless and communicatively connected with each other. System 100 may include multiple radio access network devices, such as base station 107, base station 108, or base station 109, which may be connected with each other via network 106. Each base station may be designated to a geographical area, such as base station 107 and base station 108 may be designated to area 101, while base station 109 may be designated to area 102. Each area may have multiple wired or wireless devices (e.g., internet of things (IoT) devices) that may communicate with base station 107 or base station 108. For example, area 101 may include vehicle 110, vehicle 111, mobile device 112, traffic camera 113, or traffic signal 114. Vehicle 110 or vehicle 111 may include, respectively, sensor 115 or sensor 116 and sensor 117 or sensor 118. Sensor 115, sensor 116, sensor 117, or sensor 118 may be sensors that help the vehicle operator or monitor users of the vehicle, such as oxygen sensors, pressure sensors, temperature sensors, rain sensors, or speed sensors, among others. It is contemplated herein that entities herein may be logical entities.

Data (e.g., sensor data or telemetry data) of the devices in area 101 may be sent to server 103 for storage or processing. Sensor data may be collected in vehicles by on-board inertial measurement units (IMU, including 3D accelerometers, 3D gyroscopes, and magnetometers), along with camera systems, radar, LiDAR, Global Navigation Satellite System (GNSS) and other technologies. Vehicles may use these sensors for driver assistance or automation applications. Sensors may also include proximity sensors, air quality sensors, acoustic sensors, motion sensors, or humidity sensors, among others.

With continued reference to FIG. 1, system 100 may include multimedia broadcast multicast services (MBMS) 104 (e.g., evolved MBMS) and core device 105. The MBMS bearer service includes a unicast and a broadcast mode. MBMS operation on-demand (MOOD) allows dynamic switching between unicast and broadcast over cellular network, based on configured triggers. The MBMS bearer service may use IP multicast addresses for the IP flows. MBMS bearer service transmission resources in the core and radio networks may be shared unlike unicast bearer services (e.g., interactive, streaming, etc.). For example, with the use of MBMS rather than streaming individual data streams (e.g., videos) to each user (unicast), the same data streams (e.g., video streams) are sent to everyone at the same time and the users themselves may choose (multicast). As disclosed in more detail herein, core device 105 may help identify the Tracking Area Code (TAC) or a Sub TAC of sensor data or telemetry data (herein referred to as sensor data) received from an area.

Figure 2:
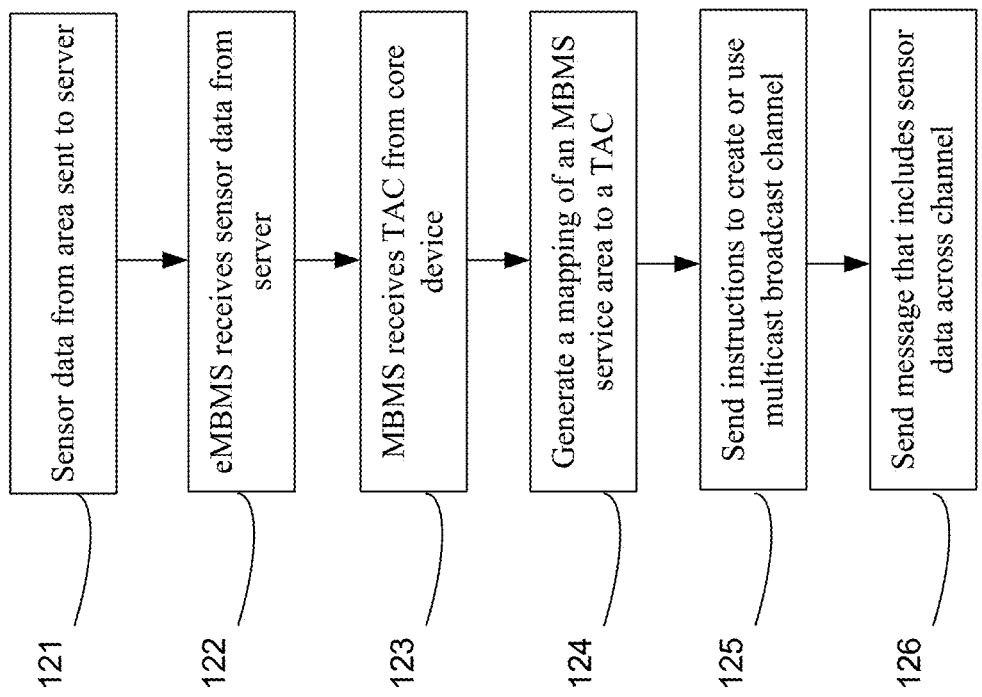
FIG. 2 illustrates an exemplary method for V2X or IoT network communication, among other things.

FIG. 2 illustrates an exemplary method for V2X or IoT network communication, among other things. At step 121, all or some sensor data from area 101 may be sent to server 103. Sensor data may be roadway pressure sensor data, camera data, infrared sensor data, traffic light data, or vehicle status data (e.g., location, speed, amount of fuel), among other things. At step 122, MBMS 104 receives data from server 103. Server 103 (or a group of servers) may perform as a central repository and may be used as a data lake which may continuously or periodically send data to MBMS 104. MBMS 104 (e.g., eMBMS core) of a cellular operators network may frequently query server 103 to fetch sensor data. At step 123, MBMS 104 may receive from core device 105 (e.g., a device in the packet core of the network) the tracking area code (TAC) or a subTAC of area 101. At step 124, based on the TAC (or subTAC) of step 123, MBMS 104 may receive or generate a mapping of an MBMS service area to the TAC.

With continued reference to FIG. 2, at step 125, based on the mapping of step 124, MBMS 104 may send the radio access network (RAN) (e.g., base station 107 and base station 108) instructions to create (or if already created then use) a multicast broadcast channel to serve the MBMS service area with the network signaling messages (that correlates the telemetric/sensor data from the server 103 that is associated with area 101). At step 126, the RAN delivers the signaling messages and the payload to the vehicles in the service area via a multicast channel. The messages may include much of the gathered data from different sensors or other IoT devices of area 101.

It is contemplated herein that the vehicles (or other end devices) may filter and use the received messages sent via the multicast channel to aid in their operations in different ways. In an example, vehicle 110 may filter out (e.g., not use) much of the data from mobile device 112 but may use data from camera 113 or vehicle 111 to determine the best route to a destination. In another example, traffic signal 114 may consider adjusting the timing of the signal and use destination or driving route data of vehicle 110 or vehicle 111 and traffic signal data from other traffic signals but may not use collision avoidance data from vehicle 110 or vehicle 111. The disclosed system allows for devices to access a large array of different types of data that may be used in new and inventive ways. Server 103 or other devices in the network may de-identify data or restrict the use of data to address privacy or security issues. In an example regarding restricting data, server 103 may not save data or may not allow access to data from IoT devices that have a particular identifier. This identifier may be a permanent identifier (e.g., device ID) or an identifier that may be dynamically adjusted to be active or inactive (e.g., a code added to the sensor data by vehicle 110).

For additional perspective, the sensor data from area 101 or area 102 may originate from any number of IoT devices, such as roadway sensors, smart refrigerators, smart watches, smart fire alarms, smart door locks, smart bicycles, medical sensors, fitness trackers, or smart security systems, among other things. Each IoT device or system may use a plurality of sensors. For example, roadway sensors may include video image processors, which use cameras mounted on tall poles adjacent to the roadway or on traffic signal mast arms over the road; microwave radar, laser radar, ultrasonic, and passive infrared sensors installed alongside or above the road, acoustic sensors installed alongside the road, proximity sensors, air quality sensors, etc. It is further contemplated that the sensor data of area 101 may be multicast to area 102, or other areas, not just the originating area as described herein. This may be triggered by a request from area 102, a threshold number of IoT device communications or threshold amount of bandwidth utilized associated with cross area communications (e.g., unicast), among other things.

Figure 3:
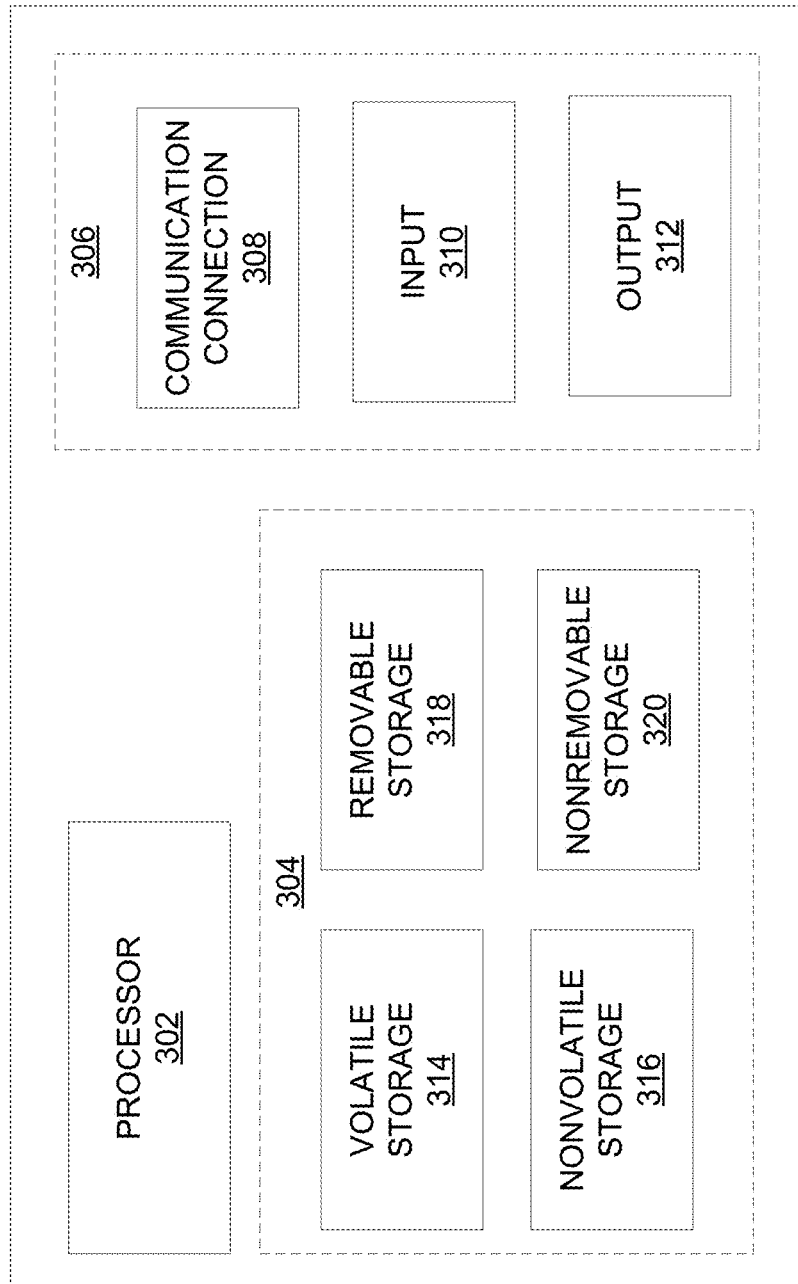
FIG. 3 illustrates a schematic of an exemplary network device.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/5G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
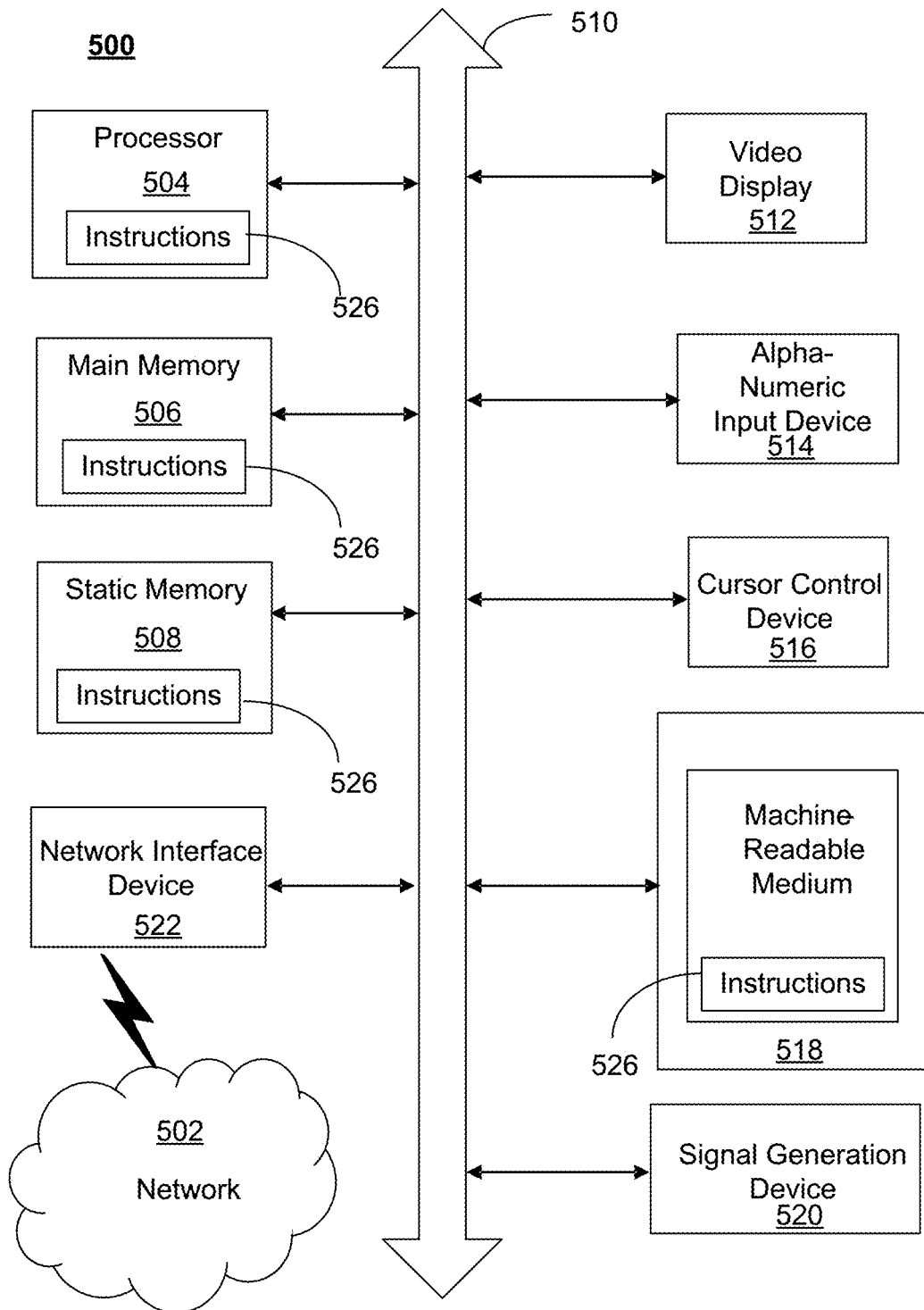
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, vehicle 110, vehicle 111, mobile device 112, traffic camera 113, or traffic signal 114, and other devices of FIG. XX1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life-especially for simple M2M devices-through enhanced wireless management.

While examples of a system in which V2X or IoT network communication alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—V2X or IoT network communication—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for receiving sensor data from a server, wherein the sensor data comprises data that originates from a plurality of devices within a geographic area, wherein the geographic area is covered by one or more base stations; receiving a tracking area code; determining a mapping of a multimedia broadcast multicast service area to a tracking area code; and sending the sensor data to the one or more base stations of a radio access network that service the geographic area, wherein the sensor data is broadcast via a single multicast broadcast channel. The sensor data may be broadcast via a single multicast broadcast channel. A method may include creating a multicast broadcast channel to serve the multimedia broadcast multicast service area. The sensor data may be associated with vehicle-to-everything communication. The sensor data of the geographic area may be used to operate an autonomous vehicle. The geographic area may be covered by one or more base stations. The sensor data may include roadway sensor data. The sensor data send to the tracking are code may be sent to vehicles (e.g., autonomous capable vehicles) in the tracking area code. The sensor data sent to the tracking are code may be for stationary internet of things devices (e.g., traffic signals or roadway pressure sensors) in the tracking area code. All combinations in this and the following paragraph (including the removal or addition of steps) are contemplated in a manner that is consistent with the other portions of the detailed description.

Methods, systems, and apparatuses, among other things, as described herein may provide for receiving sensor data from a server, wherein the sensor data comprises data that originates from a plurality of devices within a geographic area, wherein the geographic area is covered by one or more base stations; receiving a tracking area code; determining a mapping of a multimedia broadcast multicast service area to a tracking area code; and sending the sensor data to the tracking area code, wherein the sensor data is broadcast via a single multicast broadcast channel. Methods, systems, and apparatuses, among other things, as described herein may provide for receiving sensor data from a server, wherein the sensor data comprises data that originates from a plurality of devices within a geographic area, wherein the geographic area is covered by one or more base stations; receiving a tracking area code; determining a mapping of a multimedia broadcast multicast service area to a tracking area code; and sending the sensor data to the a multimedia broadcast multicast service area, wherein the sensor data is broadcast via a single multicast broadcast channel. Methods, systems, and apparatuses, among other things, as described herein may provide for receiving sensor data from a server, wherein the sensor data comprises data that originates from a plurality of devices within a geographic area; linking the sensor data of the geographic area to a tracking area code; determining a mapping of a multimedia broadcast multicast service area to the tracking area code; and sending (e.g., transmitting) the sensor data to the tracking area code. As disclosed herein, there may be some correlation of the telemetric/sensor data from the server 103 that is associated with area 101. In this regard, we ask is area 101 portion of MBMS service area or a TAC? The MBMS 104 may use area 101 to map it to a MBMS service area or a particular TAC and tag it. This information may be provided to the specific RAN serving this area 101 to broadcast the information. All combinations in this paragraph (including the removal or addition of steps) are contemplated in a manner that is consistent with the other portions of the detailed description.

What is claimed:

1. A method comprising:
receiving sensor data from a server, wherein the sensor data comprises data that originates from a plurality of devices within a geographic area;
obtaining a tracking area code from a core device in a packet core of a network, wherein the tracking area code relates to the geographic area;
linking the sensor data of the geographic area to the tracking area code; and
sending the sensor data to at least one other device in another geographic area that relates to another tracking area code based on a bandwidth of unicast communications satisfying a threshold.

2. The method of claim 1, wherein the sensor data is broadcast via a single multicast broadcast channel.

3. The method of claim 1, further comprising determining a mapping of a multimedia broadcast multicast service area to the tracking area code, and creating a multicast broadcast channel to serve the multimedia broadcast multicast service area.

4. The method of claim 3, further comprising sending the sensor data to one or more devices in the geographic area based on the mapping.

5. The method of claim 1, wherein the sensor data is associated with vehicle-to-everything communication.

6. The method of claim 1, wherein the sensor data of the geographic area is used to operate an autonomous vehicle.

7. The method of claim 1, wherein the sensor data comprises roadway sensor data.

8. The method of claim 1, wherein the at least one other device comprises at least one vehicle.

9. The method of claim 1, wherein the at least one other device comprises at least one stationary internet of things device.

10. An apparatus comprising:
a processor; and
memory coupled with the processor, the memory storing executable instructions that when executed by the processor cause the processor to effectuate operations comprising:
receiving sensor data from a server, wherein the sensor data comprises data that originates from a plurality of devices within a geographic area;
identifying a tracking area code based on communicating with a core device of a network, wherein the tracking area code relates to the geographic area;
linking the sensor data of the geographic area to the tracking area code; and
sending the sensor data to at least one other device in another geographic area that relates to another tracking area code based on a bandwidth of unicast communications satisfying a threshold.

11. The apparatus of claim 10, wherein the sensor data is broadcast via a single multicast broadcast channel.

12. The apparatus of claim 10, the operations further comprising determining a mapping of a multimedia broadcast multicast service area to the tracking area code, and creating a multicast broadcast channel to serve the multimedia broadcast multicast service area.

13. The apparatus of claim 12, the operations further comprising sending the sensor data to one or more devices in the geographic area based on the mapping.

14. The apparatus of claim 10, wherein the sensor data is associated with vehicle-to-everything communication.

15. The apparatus of claim 10, wherein the sensor data of the geographic area is used to operate an autonomous vehicle.

16. The apparatus of claim 10, wherein the sensor data comprises roadway sensor data.

17. The apparatus of claim 10, wherein the at least one other device comprises at least one vehicle.

18. The apparatus of claim 10, wherein the at least one other device comprises at least one stationary internet of things device.

19. A non-transitory computer readable storage medium storing computer executable instructions that when executed by a computing device cause said computing device to effectuate operations comprising:
receiving sensor data from a server, wherein the sensor data comprises data that originates from a plurality of devices within a geographic area;
acquiring a tracking area code from a core device in a packet core of a network, wherein the tracking area code relates to the geographic area;
linking the sensor data of the geographic area to the tracking area code; and
sending the sensor data to at least one other device in another geographic area that relates to another tracking area code based on a bandwidth of unicast communications satisfying a threshold.

20. The non-transitory computer readable storage medium of claim 19, wherein the sensor data is broadcast via a single multicast broadcast channel.

* * * * *